(12) United States Patent
Bentham

(10) Patent No.: US 9,783,345 B2
(45) Date of Patent: Oct. 10, 2017

(54) SLIDING LID FOR FOOD CONTAINER

(71) Applicant: Vegware Limited, Edinburgh (GB)

(72) Inventor: Richard Bentham, Haverhill (GB)

(73) Assignee: Vegware Limited, Edinburgh (GB)

( * ) Notice: Subject to any disclaimer, the term of this patent is extended or adjusted under 35 U.S.C. 154(b) by 143 days.

(21) Appl. No.: 14/721,675

(22) Filed: May 26, 2015

(65) Prior Publication Data

US 2015/0344197 A1 Dec. 3, 2015

(30) Foreign Application Priority Data

May 27, 2014 (GB) .................................. 1409390.0

(51) Int. Cl.
  *B65D 43/12* (2006.01)
  *B65D 43/02* (2006.01)
  *B65D 5/42* (2006.01)
  *B65D 43/20* (2006.01)

(52) U.S. Cl.
  CPC ............ *B65D 43/12* (2013.01); *B65D 5/4266* (2013.01); *B65D 43/0214* (2013.01); *B65D 43/20* (2013.01); *B65D 2543/00425* (2013.01); *Y02W 90/14* (2015.05)

(58) Field of Classification Search
  CPC ...... B65D 43/12; B65D 43/20; B65D 5/4266; B65D 43/0214; B65D 2543/00425; Y02W 90/14
  USPC ....... 229/124, 125.01, 125.12, 220; 220/252, 220/345.1, 345.2, 351, 345, 350; 206/464, 468, 462
  See application file for complete search history.

(56) References Cited

U.S. PATENT DOCUMENTS

| | | | |
|---|---|---|---|
| 2,370,997 A | | 3/1945 | Rudolph |
| 2,436,297 A | | 2/1948 | Guarnaschelli |
| 2,881,942 A | | 4/1959 | Allbright |
| 4,174,034 A | | 11/1979 | Hoo |
| 4,190,191 A | * | 2/1980 | Forbes, Jr. ............. B65D 43/12 206/464 |
| 4,463,893 A | * | 8/1984 | Brunone .................. B65D 5/32 206/468 |
| 5,405,034 A | | 4/1995 | Mittel |
| 5,632,398 A | * | 5/1997 | Baltus ................. A47J 27/0815 220/212.5 |
| 5,683,008 A | | 11/1997 | Galer |
| 5,762,226 A | * | 6/1998 | Baltus ................. A47J 27/0815 220/212.5 |
| 5,839,574 A | * | 11/1998 | Lorence ............. B65D 77/0433 206/216 |

(Continued)

*Primary Examiner* — Kareen Thomas
(74) *Attorney, Agent, or Firm* — Fay Sharpe LLP

(57) ABSTRACT

A sliding lid for a food container which has first and second flanged edge portions on opposing sides of its opening. The sliding lid includes a main lid panel with first and second flange-receiving channels configured to slidably receive the flanged edge portions of the food container from an open position, in which the opening of the container is uncovered, to a closed position, in which the main lid panel covers the opening of the container. The first and second flange-receiving channels are configured to retain the lid on the container. The sliding lid may include a backstop provided between the two flange-receiving channels and configured to restrict further sliding of the lid beyond the closed position. The sliding lid may include a front flap which can be sealed onto the container to further restrict sliding of the lid.

11 Claims, 7 Drawing Sheets

(56) References Cited

U.S. PATENT DOCUMENTS

| | | | |
|---|---|---|---|
| 6,210,638 B1 * | 4/2001 | Grieco | A61L 2/26 |
| | | | 220/345.1 |
| 7,357,273 B1 * | 4/2008 | Lutz | A47J 36/027 |
| | | | 220/366.1 |
| D583,561 S * | 12/2008 | Krusenstjerna | D3/298 |
| 2011/0049157 A1 * | 3/2011 | Nakamura | B60R 7/04 |
| | | | 220/345.1 |

* cited by examiner

SLIDING LID FOR FOOD CONTAINER

This application claims the priority of UK Patent Application No. 1409390.0 filed on May 27, 2014, the disclosure of which is incorporated herein by reference in its entirety.

FIELD OF THE INVENTION

The invention relates to a sliding lid for a food container, a blank for forming a sliding lid for a food container, a method of forming a blank for forming a sliding lid for a food container, and a method of assembling a sliding lid for a food container from a blank.

BACKGROUND TO THE INVENTION

Convenience foods are frequently packaged for sale in disposable containers. Such containers may take the form of open boxes or trays, where the containers require a sealable closure which can be easily removed and replaced by both packagers and consumers.

Cold foods such as fruit or salads, or warm foods such as pastas or stews, are often placed in open containers which require a lid. In particular, many such containers frequently possess flanged edges around their openings which can be used to help attach and retain lids. The containers can be covered with plastic films, which are able to form a seal around the flanged edges. These, however, can be damaged easily, are not suitable for stacking filled containers, and are usually not resealable once uncovered. Paper coverings, which are folded over each flanged edge and sealed with, for example, a label, are an alternative, but these are time-consuming for the packager to attach to each container and they may become detached easily. There are also rigid plastic coverings which engage with the flange along each edge, and thereby retain the lid on the container, but these are more costly to produce.

It would be beneficial to provide a lid for a food container with flanged edges, which is easily attached to and removed from the container, which is not easily damaged during transport or stacking, which is retained on the container reliably, and which is economical to produce. It would also be preferable for such a lid to be capable of being disposed in an environmentally friendly way.

SUMMARY OF THE INVENTION

A first aspect of the invention provides for a sliding lid for a food container having first and second flanged edge portions on opposing sides of an opening, the sliding lid comprising a main lid panel having first and second flange-receiving channels configured to slidably receive the flanged edge portions of the container from an open position in which the opening of the container is uncovered to a closed position in which the main lid panel covers the opening of the container, the first and second flange-receiving channels being configured to retain the lid on the container. The flange-receiving channels of the lid allow the lid to be reversibly slid onto a flanged edge food container, such that the food contents may be easily covered and uncovered by both packagers and users.

In some embodiments of the invention, the lid further comprises a backstop provided between the two flange-receiving channels, the backstop being configured to restrict further sliding of the lid beyond the closed position. The backstop further restricts excessive sliding of the lid once the lid covers the opening of the container.

It may be that the backstop comprises a stopping portion and a backstop guide, wherein said backstop guide is configured to direct a third edge portion of the container extending between the first and second flanged-edge portions towards the stopping portion of the backstop as the lid is slid towards the closed position.

Typically, the backstop stopping portion comprises a third flange-receiving channel configured to slidably receive a flanged edge of the third edge portion of the container to thereby restrict further sliding of the lid beyond the closed position, wherein the backstop guide is configured to direct the third flanged edge portion of the container into the third flange-receiving channel.

Typically, the lid further comprises a front flap extending from the main lid panel and a first fold line positioned between the front flap and the main lid panel, the first fold line extending at least part (or all) of the way between the first and second flange-receiving channels, the front flap having a front flap open position when folded in a first (rotational) sense along said first fold line such that sliding of the first and second flanged edge portions of the container into, out of and along the first and second flange-receiving channels between the open and closed positions is permitted, the front flap also having a front flap closed position when folded in a second opposite (rotational) sense along said first fold line, in which sliding of the lid from the closed position to the open position is restricted.

In a preferable embodiment, the main lid panel further comprises a second fold line extending at least part (or all) of the way between the first and second flange-receiving channels, the second fold line being set back from the first fold line towards the backstop, wherein folding of the front flap along the second fold line in the first sense increases an opening area of the flange-receiving channels as compared to when the front flap is folded along the first fold line in the first sense and not along the second fold line. Folding along the second fold line facilitates insertion of the flanged edge portions of the container into the flange-receiving channels.

The front flap may further comprise a main flap portion and a front tab, wherein a force applied to the front tab in the first sense causes the front flap to move towards the front flap open position, and wherein a force applied to the front tab in the second sense causes the front flap to move towards the front flap closed position.

In some embodiments, the main lid panel further comprises a transparent window. This may be constructed from compostable material. In alternative embodiments, the lid is constructed from compostable materials.

In a preferred embodiment, the first and second flange-receiving channels each comprise a line of adhesive extending longitudinally within the respective channel. The lines of adhesive increase the mechanical strength of the sliding lid and act as guides to direct the flanged edges of the container along the channels. This is useful in embodiments with and without the backstop. In some embodiments the backstop is also adhered to one or more of the main lid panel and the first and second flange-receiving channels. The components of the lid are thereby adhered to one another and are not necessarily adhered to the food container when in use. The sliding lid may therefore be used in situations where adherence of the lid to the container by means of an adhesive is difficult, for example when the edges of the container are wet.

A second aspect of the invention provides for a blank for assembling a sliding lid for a food container having first and second flanged edge portions on opposing sides of an opening, the blank comprising: first and second channel-forming panels extending from opposing sides of a main lid panel; a first fold line extending at least part of the way along a boundary between the first channel-forming panel and the main lid panel; and a second fold line extending at least part of the way along a boundary between the second channel-forming panel and the main lid panel, wherein the first and second channel-forming panels are foldable along the first and second fold lines respectively in a first (rotational) sense to form first and second flange-receiving channels. In some embodiments, the blank further comprises a backstop panel extending from the main lid panel between the first and the second channel-forming panels; and a third fold line extending at least part of the way along a boundary between the backstop panel and the main lid panel, and wherein the backstop panel is foldable along the third fold line to form a backstop.

Typically, the blank comprises a backstop guide panel extending from the backstop panel and a fourth fold line extending at least part of the way along the boundary between the backstop guide panel and the backstop panel, the backstop guide panel being foldable along the fourth fold line to form a backstop guide.

Commonly, the backstop panel comprises a third channel-forming panel, the third channel-forming panel being foldable along the third fold line to form a third flange-receiving channel.

In some embodiments, the blank further comprises a front flap panel extending from the main lid panel and a fifth fold line extending at least part of the way along the boundary between the main lid panel and the front flap panel, wherein folding the front flap panel along the fifth fold line forms a front flap. The main lid panel may further comprise a sixth fold line extending at least part of the way between the first and the second channel-forming panels, the sixth fold line being set back from the fifth fold line towards the third fold line.

Furthermore, the blank may comprising a front tab panel extending from the front flap panel and a seventh fold line extending at least part of the way along the boundary between the front tab panel and the front flap panel, wherein the front tab panel is foldable along the seventh fold line to form a front tab.

In some embodiments the panels of the blank may be formed from an integral piece of material. It may also be that only the first and second channel-forming panels, the backstop panel and at least part of the main lid panel of the blank are formed from an integral piece of material. In other embodiments the lid may also comprise a transparent window adhered to the main lid panel. Such a transparent window may comprise or consist of one or more compostable materials. The blank may also be constructed from compostable materials.

In some embodiments, a surface of the blank comprises discrete portions or (continuous) lines of adhesive adjacent to the first fold line, adjacent to the second fold line and adjacent to the third fold line. In other embodiments, the blank comprises first and second (continuous) lines of adhesive adjacent to the first and the second fold lines and discrete portions of adhesive material adjacent to the third fold line. The lines of adhesive serve to increase the mechanical strength of the assembled lid and, furthermore, form guide lines to direct the movement of the flanged edges of the container along the flange-receiving channels. In further embodiments, the blank comprises discrete portions of adhesive on the main backstop panel.

References to, for example, the first fold line, the second fold line, the third fold line, and so on, are to be read as labels and do not imply the total number of fold lines present in the invention.

A third aspect of the invention provides for a method of forming a blank for a sliding lid for a food container comprising the steps of providing an unfolded blank comprising a main lid panel, and first and second channel-forming panels extending from opposing sides of the main lid panel, and forming a first fold line along the boundary between the first channel-forming panel and the main lid panel, and a second fold line along the boundary between the second channel-forming panel and the main lid panel.

Typically, the method further comprises applying discrete portions or (continuous) lines of adhesive material adjacent to the first and second fold lines.

A fourth aspect of the invention provides for a method of forming a blank for a sliding lid for a food container comprising the steps of providing an unfolded blank comprising a main lid panel, first and second channel-forming panels extending from opposing sides of the main lid panel and a backstop panel extending from the main lid panel between the first and second channel-forming panels, and forming a first fold line along the boundary between the first channel-forming panel and the main lid panel, a second fold line along the boundary between the second channel-forming panel and the main lid panel and a third fold line between the backstop panel and the main lid panel.

Typically, the method further comprises applying discrete portions or (continuous) lines of adhesive material adjacent to the first, the second and the third fold lines.

In some embodiments, the method further comprises applying discrete portions or lines of adhesive to the backstop panel and adjacent to the first, second and third fold lines. In a preferred embodiment, the method comprises applying continuous lines of adhesive adjacent to the first and second fold lines and discrete portions of adhesive adjacent to the third fold line and on the backstop panel. Continuous lines of adhesive may be applied from a roller to the blank such this element of the manufacturing process may be mechanised and thereby made more efficient.

A fifth aspect of the invention provides for a method of assembling the sliding lid cover for a container from the blank, the method comprising: folding the first channel-forming panel along the first fold line and attaching it to the main lid panel; and folding the second channel-forming panel along the second fold line and attaching it to the main lid panel. The first and second channel-forming panels of the sliding lid are thereby adhered directly to the main lid panel, but not necessarily to the container it is configured to cover.

A sixth aspect of the invention provides for a method of assembling the sliding lid cover for a container from the blank, the method comprising: folding the first channel-forming panel along the first fold line and attaching it to one or more of the main lid panel and the backstop panel; folding the second channel-forming panel along the second fold line and attaching it to one or more of the main lid panel and the backstop panel; and folding the backstop panel along the third fold line and attaching it to any one or more of the main lid panel and first channel-forming panel and the second channel-forming panel. The various panels of the sliding lid are thereby adhered directly to one another, but not necessarily to the container it is configured to cover.

A seventh aspect of the invention provides for a kit of parts comprising a sliding lid according to the first aspect of the invention, or formed from a blank according to the second aspect of the invention, or made from a blank formed according to the third or fourth aspects of the invention, or assembled according to the method of the fifth or sixth aspects of the invention, and a food container having first and second flanged edge portions which are on opposing sides of a tray and are configured to slidably engage with the sliding lid. An eighth aspect of the invention provides for the assembled kit of parts of a sliding lid and food container, food being retained in the container, the sliding lid being retained on the flanged edge portions of the container, the sliding lid covering the opening of the container, and the sliding lid being sealed to the container by means of an adhesive or an adhesive label. In further embodiments, the sliding lid is sealed to the container by the application of heat to an additional thermoplastics layer (a heat seal).

Optional features described in relation to any one of the aspects of the invention are optional features of each aspect of the invention.

References to, for example, the first fold line, the second fold line, the third fold line, and so on are intended as labels for the various fold lines and do not imply the presence or absence of other fold lines. For example, the invention extends to a sliding lid or blank with the first fold line, the second fold line, the third fold line, the fourth fold line and the seventh fold line, but not the fifth fold line or the sixth fold line.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
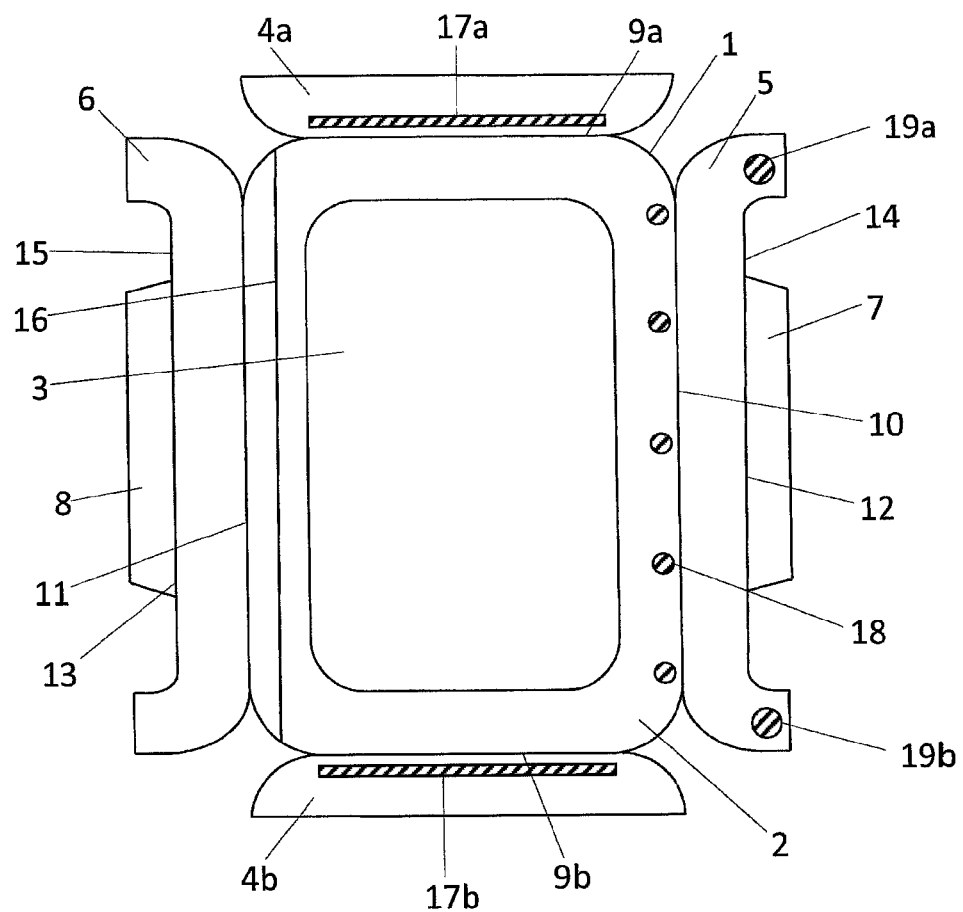
FIG. 1 is a plan view of a blank for the assembly of a sliding lid.
Figure 2:
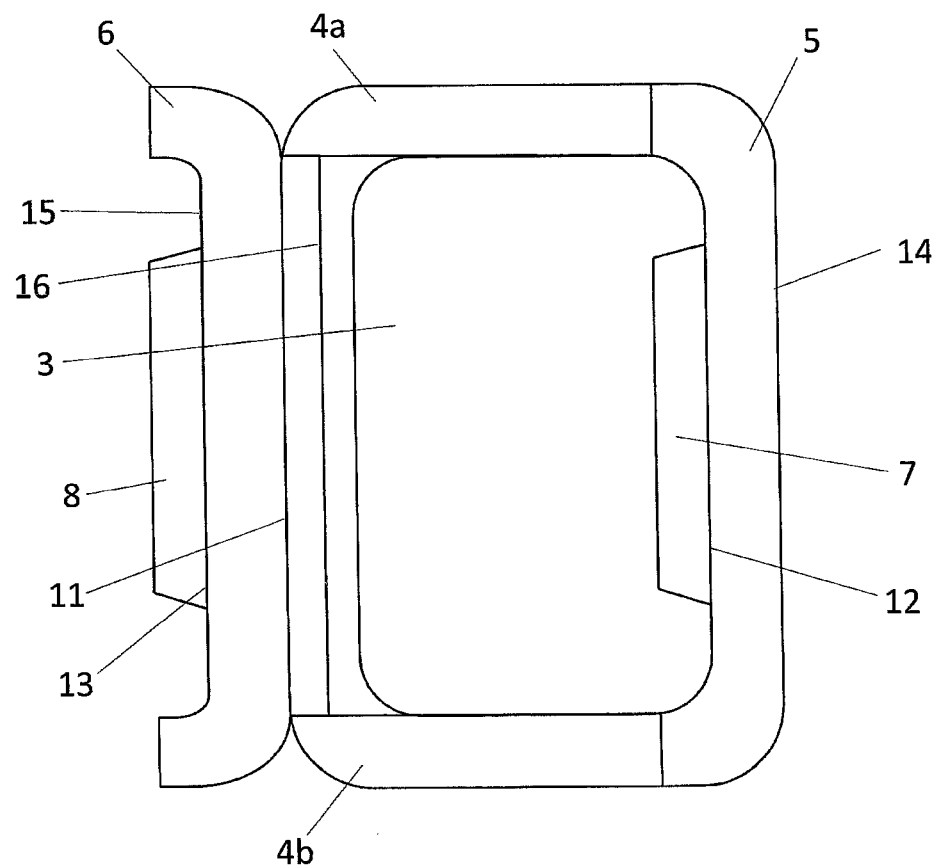
FIG. 2 is a plan view of a sliding lid assembled from the blank of FIG. 1.

With reference to FIGS. 1 and 2, a blank 1 for the construction of a sliding lid comprises a generally rectangular main lid panel 2 and a transparent window 3. The main lid panel is made from a paperboard material and the transparent window is made from a compostable plastics material. The main lid panel is planar and has a first side, a second side, a third side and a fourth side. The first side is opposite the second side, and the third side is opposite the fourth side. The corners of the main lid panel are generally rounded. Two channel-forming panels 4a and 4b extend from the opposing first and second sides of the main lid panel. A backstop panel 5 extends from the third side of the main lid panel between the two channel-forming panels 4a and 4b. The backstop panel is generally corniculate in shape, with hornlike protrusions of curvature generally commensurate with the rounded corners of the main lid panel. A front flap panel 6 extends from the fourth side of the main lid panel. Additionally, a backstop guide panel 7 extends from the backstop panel 5, and a front tab panel 8 extends from the front flap panel 6.

The boundaries between the panels 2, 4a, 4b, 5, 6, 7 and 8 are demarcated by fold lines. Two fold lines 9a and 9b extend along the boundaries between the main lid panel 2 and each channel-forming panel 4a and 4b respectively. A third fold line 10 extends along the boundary between the main lid panel 2 and the backstop panel 5. A fourth fold line 11 extends along the boundary between the main lid panel 2 and the front flap panel 6. A fifth fold line 12 extends along the boundary between the backstop panel 5 and the backstop tab 7. A sixth fold line 13 extends along the boundary between the front flap panel 6 and the front tab 8. Together the backstop panel 5, the backstop tab 7 and the two fold lines 10 and 12 form a backstop 14. Together the front flap panel 6, the front tab 8 and the two fold lines 11 and 13 form a front flap 14. A seventh fold line 15 extends across the main lid panel 2 between the channel-forming panels 4a and 4b and is set back from the fold line 11 towards the transparent window 3.

The blank for the sliding lid further comprises two lines of adhesive 17a and 17b, adjacent and generally parallel to the channel-forming fold lines 9a and 9b, and a series of discrete portions of adhesive 18 adjacent to the backstop fold line 10. The backstop panel also comprises two portions of adhesive 19a and 19b on the two hornlike protrusions.

Figure 3:
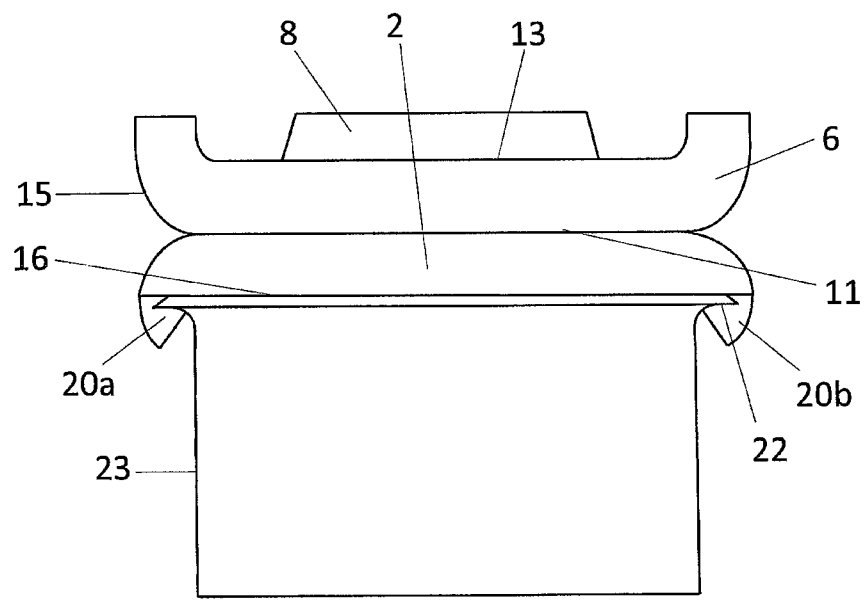
FIG. 3 is a front view of a container and the sliding lid of FIG. 2 covering an opening of the container.

With references to FIGS. 1, 2 and 3, a sliding lid 20 is assembled from the blank 1. The channel-forming panels 4a and 4b are folded along the fold lines 9a and 9b and adhered to the main lid panel 2 by the lines of adhesive 17a and 17b. The backstop panel 5 is folded across the fold line 10 and adhered to the main lid panel 2 by the portions of adhesive 18. The backstop panel is additionally adhered to the channel-forming panels 4a and 4b by the adhesive portions 19a and 19b. The hornlike protrusions of the backstop panel (which are optional) provide additional overlap with the channel-forming panels, increasing the available surface area for adhesion and improving the mechanical strength of the attachment. The protrusions of the backstop panel also provide for adhesion to the channel-forming panels at points further away from the fold line 10, thereby providing a further increase in mechanical strength by a principle of levers. In this way, the backstop 14 and two flange-receiving channels 21a and 21b, are assembled. The adhesion of the backstop panel to the channel-forming panels increases the overall mechanical strength of the lid.

The sliding lid 20 is configured to be slid onto the flanged edge 22 of a food container 23. The widths of the two channel-forming panels 4a and 4b, and thus the flange-receiving channels 21a and 21b, are configured to receive the flanged edge 22 such that the flanged edge may slide freely into the channels and that the channels will retain the lid on the container once the flanged edge has been inserted. The lines of adhesive 17a and 17b within the channels 21a and 21b increase the mechanical strength of the channels and also form guide lines to direct the flanged edges of the container along the channels.

By folding the front flap 15 back along fold line 16, the entrances to the flange-receiving channels 21a and 21b are exposed. The exposed surface area of the channels 21a and 21b is greater than if the front flap were to only be folded back along fold line 11. Fold line 16 therefore facilitates sliding of the lid onto the container. Front tab 8 acts as a handle to allow easier manual folding back of the front flap.

Figure 4:
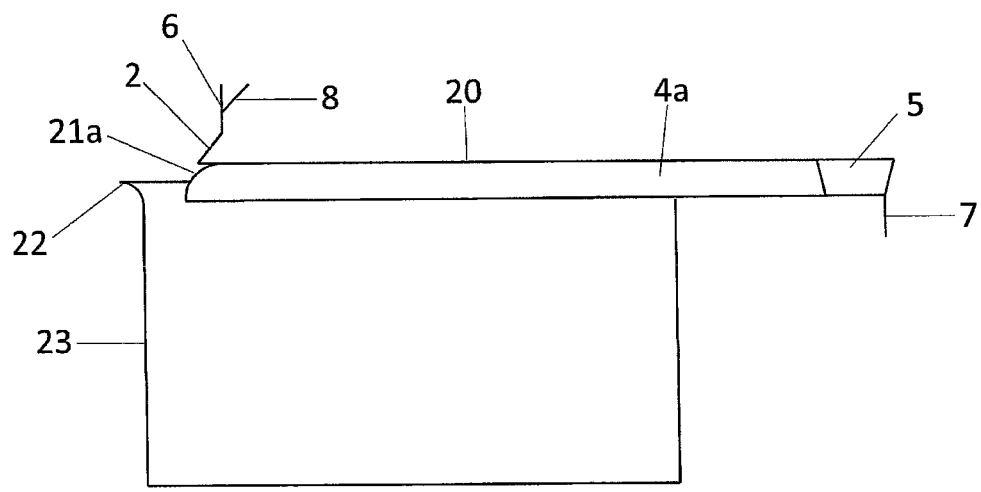
FIG. 4 is a side view of the container and sliding lid of FIG. 3, the sliding lid partially covering the opening of the container.
Figure 5:
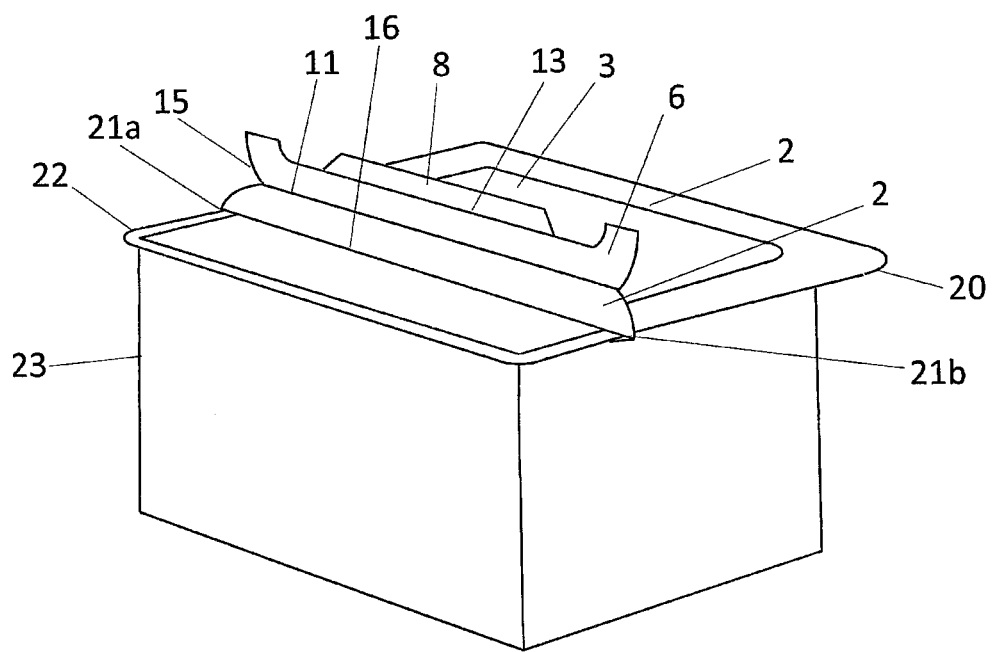
FIG. 5 is a perspective view of the container and sliding lid of FIG. 4, the sliding lid partially covering the opening of the container.

FIG. 4 illustrates a side view of the sliding lid when partially covering the opening of the container. The front flap 15 is folded back along fold line 16 to allow passage of the flanged edge 22 along the flange-receiving channel 21*a*. The backstop guide 7 protrudes from a lower side of the sliding lid. The backstop guide directs the flanged edge of the container towards the rear flange-receiving channel formed between the backstop panel 5 and the main lid panel 2. Collectively, the backstop guide 7 and the backstop panel 5 form the backstop 14, which acts to hinder further sliding of the lid in the direction of closure once the lid covers the opening of the container. This same state of partial closure is illustrated in perspective in FIG. 5.

Figure 6:
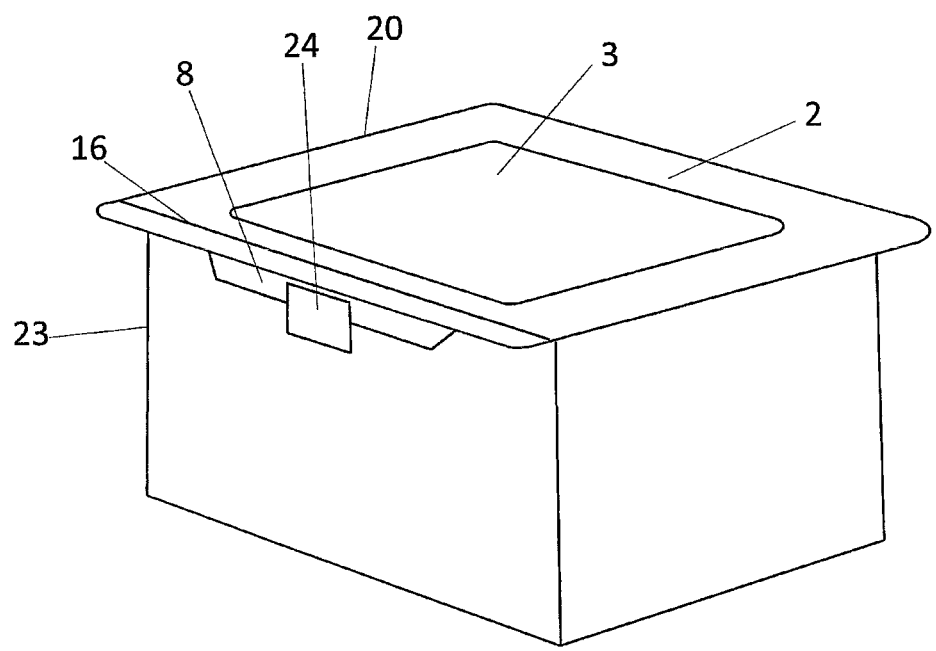
FIG. 6 is a perspective view of the container and sliding lid of FIG. 5, the sliding lid covering the opening of the container.
Figure 7:
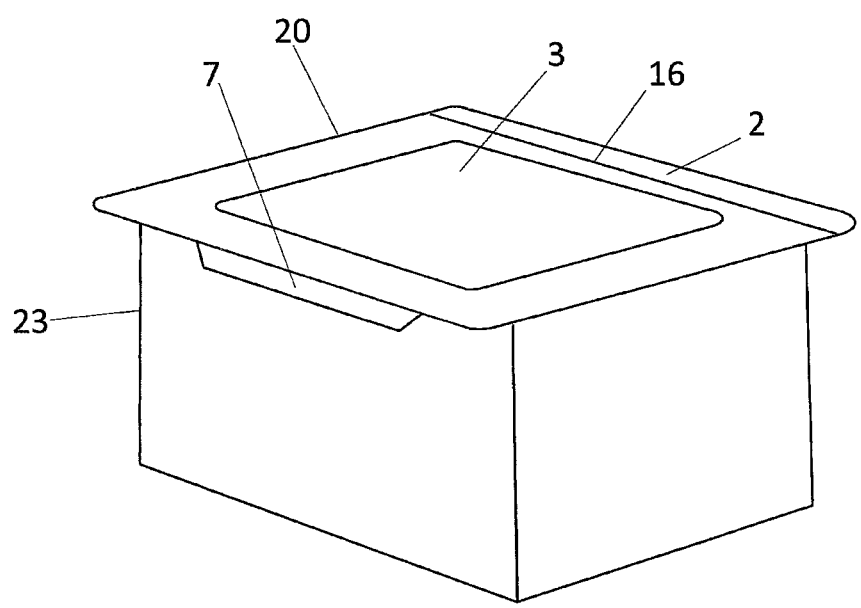
FIG. 7 is an alternative perspective view of the container and lid of FIG. 6.

Once the sliding lid has covered the opening of the container, the front flap 15 may be folded along fold lines 11 and 16 such that the openings of the flange-receiving channels 21*a* and 21*b* are covered. Since the flanged edges of the container are now enveloped by the channels formed along all four sides of the lid, horizontal sliding of the lid and vertical movement are restricted. The front flap may also be sealed against the container by applying an adhesive label 24 overlapping the edge of the front tab 8 and the container body 23 as shown in FIG. 6. FIG. 7 illustrates the same arrangement of the lid on the container from a different perspective.

As the blank is provided with adhesive portions, the sliding lid may be assembled quickly by the food packager. The front flap arrangement, which can act as a lever to open the flange-receiving channels, also allows the assembled lid to slide onto a container quickly and easily.

The sliding lid is removable and reusable. By folding the front flap 15 back again across fold line 16 from a closed position, the flange-receiving channels 21*a* and 21*b* may be exposed, allowing the lid to be slid back into an open position. The user may, therefore, use the lid to cover partially consumed food for further storage.

As the lid is formed from paperboard and compostable plastics, it will decompose when thrown away in contrast to other lid designs produced in non-compostable plastics.

Further variations and modifications may be made within the scope of the invention herein disclosed.

The invention claimed is:

1. A sliding lid for an associated food container having first and second flanged edge portions on opposing sides of an opening, the sliding lid comprising:
   a main lid panel having first and second flange-receiving channels configured to slidably receive the flanged edge portions of the container from an open position in which the opening of the container is uncovered to a closed position in which the main lid panel covers the opening of the container, the first and second flange-receiving channels being configured to retain the lid on the container; and
   a backstop provided between the two flange-receiving channels, the backstop being configured to restrict further sliding of the lid beyond the closed position, wherein the backstop comprises a stopping portion and a backstop guide, wherein said backstop guide is configured to direct a third edge portion of the container extending between the first and second flanged-edge portions towards the stopping portion of the backstop as the lid is slid towards the closed position.

2. The sliding lid of claim 1, wherein the backstop stopping portion comprises a third flange-receiving channel configured to slidably receive a flanged edge of the third edge portion of the container to thereby restrict further sliding of the lid beyond the closed position, wherein the backstop guide is configured to direct the flanged edge of the third edge portion of the container into the third flange-receiving channel.

3. The sliding lid of claim 1, wherein the lid further comprises a front flap extending from the main lid panel and a first fold line positioned between the front flap and the main lid panel, the first fold line extending at least part of the way between the first and second flange-receiving channels, the front flap having a front flap open position when folded in a first sense along said first fold line such that sliding of the first and second flanged edge portions of the container into, out of and along the first and second flange-receiving channels between the open and closed positions is permitted, the front flap also having a front flap closed position when folded in a second opposite sense along said first fold line, in which sliding of the lid from the closed position to the open position is restricted.

4. The sliding lid of claim 3, wherein the main lid panel further comprises a second fold line extending at least part of the way between the first and second flange-receiving channels, the second fold line being set back from the first fold line towards the backstop.

5. The sliding lid of claim 3, wherein the front flap comprises a main flap portion and a front tab, wherein a force applied to the front tab in the first sense causes the front flap to move towards the front flap open position, and wherein a force applied to the front tab in the second sense causes the front flap to move towards the front flap closed position.

6. The sliding lid of claim 1, wherein each of the first and second flange-receiving channels comprises a line of adhesive extending longitudinally within the respective channel.

7. A kit of parts comprising the sliding lid of claim 1 and a food container having first and second flanged edge portions on opposing sides of an opening.

8. A sliding lid for an associated food container having first and second flanged edge portions on opposing sides of an opening, the sliding lid comprising:
   a main lid panel having first and second flange-receiving channels configured to slidably receive the flanged edge portions of the associated container from an open position, in which the opening of the container is uncovered, to a closed position, in which the main lid panel covers the opening of the container, the first and second flange-receiving channels being configured to retain the lid on the container, a front flap extending from the main lid panel and a first fold line positioned between the front flap and the main lid panel, the first fold line extending at least partway between the first and second flange-receiving channels, the front flap having a front flap open position when folded in a first sense along said first fold line such that sliding of the first and second flanged edge portions of the container into, out of and along the first and second flange-receiving channels between the open and closed positions is permitted, the front flap also having a front flap closed position when folded in a second opposite sense along said first fold line, in which sliding of the lid from the closed position to the open position is restricted, wherein each of the first and second flange-receiving channels comprises a line of adhesive extending longitudinally within the channel.

9. The sliding lid of claim 8, wherein the main lid panel further comprises a second fold line extending at least partway between the first and second flange-receiving channels, the second fold line being set back from the first fold line towards a backstop.

10. The sliding lid of claim 8, wherein the front flap comprises a main flap portion and a front tab, wherein a force applied to the front tab in the first sense causes the front flap to move towards the front flap open position, and wherein a force applied to the front tab in the second sense causes the front flap to move towards the front flap closed position.

11. A kit of parts comprising the sliding lid of claim 8 and a food container having first and second flanged edge portions on opposing sides of an opening.

* * * * *